United States Patent
Yoshida et al.

(10) Patent No.: US 8,124,281 B2
(45) Date of Patent: Feb. 28, 2012

(54) HYDROGEN STORAGE ALLOY ELECTRODE AND ALKALINE STORAGE BATTERY USING THE SAME

(75) Inventors: Shuhei Yoshida, Moriguchi (JP); Kazuaki Tamura, Moriguchi (JP); Yoshinobu Katayama, Moriguchi (JP); Teruhito Nagae, Moriguchi (JP); Masao Takee, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 738 days.

(21) Appl. No.: 12/199,502

(22) Filed: Aug. 27, 2008

(65) Prior Publication Data

US 2009/0061316 A1    Mar. 5, 2009

(30) Foreign Application Priority Data

Aug. 29, 2007  (JP) .................... 2007-222307

(51) Int. Cl.
  *H01M 4/58* (2010.01)
  *H01M 4/00* (2010.01)

(52) U.S. Cl. ............... 429/218.2; 429/223; 429/231.6; 429/206; 429/129

(58) Field of Classification Search ............ 429/218.2, 429/223, 231.6, 224, 229, 206, 129; 252/182.1; 428/615, 402; 423/647
See application file for complete search history.

(56) References Cited

U.S. PATENT DOCUMENTS
2009/0104527 A1 *  4/2009  Ozaki et al. ............ 429/218.2

FOREIGN PATENT DOCUMENTS
| | | |
|---|---|---|
| EP | 1 713 139 A1 | 10/2006 |
| JP | 3241047 B2 | 12/2001 |
| JP | 2002-164045 A | 6/2002 |
| WO | 96-33518 A1 | 10/1996 |

OTHER PUBLICATIONS

European Search Report dated Dec. 15, 2008 issued in corresponding European Patent Application No. 08015043.6.
Wu, Mao-Sung et al.; "Surface treatment for hydrogen storage alloy of nickel/metal hydride battery" Journal of Alloys and Compounds, Elsevier Sequoia, Lausanne, Ch. vol. 302. p. 248-257. (2000).

* cited by examiner

*Primary Examiner* — Raymond Alejandro
(74) *Attorney, Agent, or Firm* — Westerman, Hattori, Daniels & Adrian, LLP

(57) ABSTRACT

A hydrogen storage alloy used in a hydrogen storage alloy electrode 11 has a crystalline structure having a mixed phase made up of at least an $A_2B_7$ type structure and an $A_5B_{19}$ type structure, and a surface layer of hydrogen storage alloy particles is so formed as to have a nickel content ratio greater than that of a bulk. The ratio (X/Y) of the nickel content ratio X (% by mass) of the surface layer to the nickel content ratio Y (% by mass) of the bulk is greater than 1.0 but no more than 1.2 ($1.0 < X/Y \leq 1.2$). The gradient between the content ratio of the nickel in the surface layer of the hydrogen storage alloy particles and the content ratio of the nickel in the bulk is alleviated and a hydrogen storage alloy electrode with high output characteristics is obtained.

4 Claims, 1 Drawing Sheet

HYDROGEN STORAGE ALLOY ELECTRODE AND ALKALINE STORAGE BATTERY USING THE SAME

TECHNICAL FIELD

The present invention relates to an alkaline storage battery suited to applications requiring high-current discharge such as hybrid electric vehicles (HEVs) and pure electric vehicles (PEVs). More particularly it relates to a hydrogen storage alloy electrode used in an alkaline storage battery for such applications, and to an alkaline storage battery in which such hydrogen storage alloy electrode is used.

BACKGROUND

Over recent years, alkaline storage batteries—especially nickel-hydrogen storage batteries—have come to be used as power sources for equipment of which high output is demanded, such as hybrid electric vehicles (HEVs) and pure electric vehicles (PEVs). The hydrogen storage alloy used for the negative electrode active material of nickel-hydrogen storage batteries is generally $LaNi_5$ or other $AB_5$-type rare earth hydrogen storage alloy, partially replaced with an element such as aluminum (Al) or manganese (Mn). Because such $AB_5$-type rare earth hydrogen storage alloy contains Al, Mn or the like having lower melting points, segregated phases such as Al-rich phases or Mn-rich phases are known to be readily generated at the crystal grain boundaries and surfaces thereof.

It is also known that various different crystalline structures are obtained through combinations of $AB_2$ and $AB_5$ type structures. An example is the hydrogen storage alloy put forward in JP-A-2002-164045, which has an $A_2B_7$ type structure whereby a rare earth-nickel type $AB_5$ type structure is made to contain Mg, and an $AB_2$ type structure and the $AB_5$ type structure are stacked over each other with a period of two layers. In this hydrogen storage alloy put forward in JP-A-2002-164045, improvement of the hydrogen intercalation-deintercalation cycle life is enabled. However, it is evident that the hydrogen storage alloy with the structure put forward by JP-A-2002-164045 gives inadequate high-output performance (assist output) and has unsatisfactory performance for high-output applications.

Accordingly, as a means of enhancement to high output, Japanese Patent No. 3241047 put forward a hydrogen storage alloy in which nickel-rich regions were provided in an $AB_5$ type structure alloy surface and the surface activity point was increased.

However, when the foregoing hydrogen storage alloy put forward in Japanese Patent No. 3241047 was used to construct a hydrogen storage alloy electrode, and in turn the hydrogen storage alloy electrode was used to construct an alkaline storage battery, it became evident that the resulting battery did not have adequate high-output performance. This is because when an alkaline storage battery is constructed using a hydrogen storage alloy in which an $AB_5$ type structure such as $LaNi_5$ has been partially replaced with an element such as Al or Mn, the rare earth elements and Al, Mn or the like that are present in the surface layer of hydrogen storage alloy particles dissolve into the electrolyte as a result of charge/discharge of the battery subsequent to assembly.

As a result, alteration occurs in the crystalline structure of the surface layer of hydrogen storage alloy particles, alteration also occurs in the content ratios of the nickel present in the surface layer and present in the bulk, and a gradient of such nickel content ratio arises. More precisely, as a result of elution of the dissolved components such as the rare earth elements and Al, Mn or the like, the ratio of the nickel present in the surface layer becomes relatively large, while the ratio of the nickel present in the bulk becomes relatively small. Thereby, the crystalline structure of the hydrogen storage alloy in surface layer is altered and diffusion of hydrogen is inhibited, so that adequate high-output performance cannot be yielded.

SUMMARY

An advantage of some aspects of the invention is to provide a hydrogen storage alloy electrode in which the gradient between the content ratio of the nickel in the surface layer of the hydrogen storage alloy particles and the content ratio of the nickel in the bulk is alleviated, and which has high output characteristics, as well as to provide an alkaline storage battery that uses such a hydrogen storage alloy electrode with high output characteristics.

According to a first aspect of the invention, a hydrogen storage alloy used in a hydrogen storage alloy electrode of the present invention has a crystalline structure that has a mixed phase made up of at least an $A_2B_7$ type structure and an $A_5B_{19}$ type structure, and a surface layer of hydrogen storage alloy particles is so formed as to have a nickel content ratio greater than that of a bulk. The ratio (X/Y) of the nickel content ratio X (% by mass) of the surface layer to the nickel content ratio Y (% by mass) of the bulk is greater than 1.0 but no more than 1.2 ($1.0 < X/Y \leq 1.2$).

Generally, after an alkaline storage battery is assembled, the dissolved components such as rare earth elements and Al, Mn or the like in the surface layer of the hydrogen storage alloy particles dissolve into alkaline electrolyte as a result of charge/discharge of the battery, and consequently the content ratio (mass ratio) of nickel in the surface layer relatively increases than that in the bulk. In the present invention, the $A_5B_{19}$ type structure hydrogen storage alloy has a crystalline structure whereby an $AB_2$ type structure and an $AB_5$ type structure are stacked over each other with a period of three layers, and the crystal lattice's a-axis and c-axis are shorter than in $AB_5$ type structure. As a result, the lattice volume is small and it is possible to increase the content ratio of nickel per unit crystal lattice.

By causing such $A_5B_{19}$ type structure, whose nickel content ratio can be increased, to be present in the bulk of the hydrogen storage alloy particles, the gradient between the content ratio of the nickel in the surface layer of the hydrogen storage alloy particles and the content ratio of the nickel in the bulk is alleviated, unlike with the $AB_5$ type structure hydrogen storage alloy particles of the related art. Thereby, alteration (such as decrystallization) of the crystalline structure in the surface layer of hydrogen storage alloy particles is curbed, and hydrogen diffusion resistance is reduced. As a result, a hydrogen storage alloy electrode possessing high output characteristics can be obtained.

Preferably the hydrogen storage alloy, which has a mixed phase constituted of at least an $A_2B_7$ type structure and an $A_5B_{19}$ type structure, will be expressed by general formula: $Ln_{1-x}Mg_xNi_{y-a-b}Al_aM_b$, where Ln is at least one element selected from among rare earth elements including yttrium (Y), M is at least one element selected from among Co, Mn and Zn, and $0.1 \leq x \leq 0.2$, $3.5 \leq y \leq 3.9$, $0.1 \leq a \leq 0.3$, $0 \leq b \leq 0.2$. This is because if $x > 0.20$, magnesium would segregate, and if $a > 0.30$, aluminum would segregate, causing a fall in corrosion resistance in each case; and also because if $y < 3.5$ or $y > 3.9$, it would be difficult to configure an $A_5B_{19}$ type structure.

The $A_5B_{19}$ type structure used will preferably be selected from among crystalline phases having at least a $Ce_5Co_{19}$ type structure. The surface layer of the hydrogen storage alloy corresponds to the region where the particles of the hydrogen storage alloy contact with the electrolyte; specifically the sickness of such layer extends 100 nm inward from the surface of the hydrogen storage alloy. To construct an alkaline storage battery using a hydrogen storage alloy electrode, it will suffice to provide the hydrogen storage alloy electrode, a nickel positive electrode with nickel hydroxide as main positive electrode active material, a separator to keep these two electrodes apart, and an alkaline electrolyte, inside an outer can.

In the invention the gradient between the content ratio of the nickel in the surface layer of the hydrogen storage alloy particles and the content ratio of the nickel present in the bulk is alleviated, so that the hydrogen diffusion resistance is reduced, and a hydrogen storage alloy electrode can be obtained which has high output characteristics (high assist output) far excelling the ranges of the related art, and moreover which enables construction of an alkaline storage battery with high output characteristics (high assist output).

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
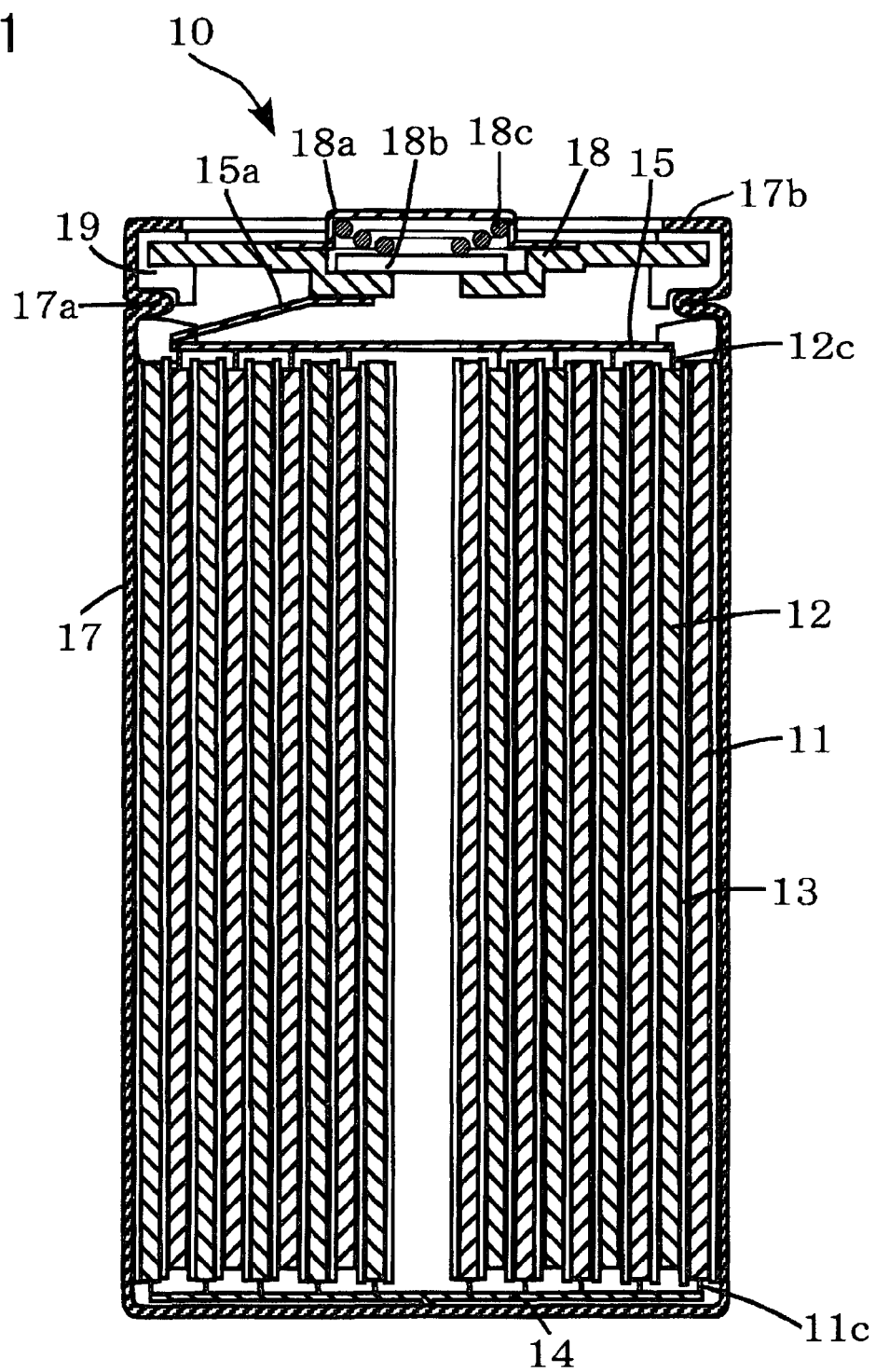
FIG. 1 is a cross-sectional view illustrating schematically an alkaline storage battery of the invention.

Embodiments of the invention will now be described in detail with reference to FIG. 1. It should be understood however that the embodiments below are intended by way of examples, not by way of limiting the invention to these particular electrodes or batteries. Numerous variants of these embodiments could be implemented through appropriate changes without departing from the scope and spirit of the claims. FIG. 1 is a cross-sectional view illustrating schematically an alkaline storage battery of the invention.

1. Hydrogen Storage Alloys

Hydrogen storage alloys a to e were fabricated by mixing metallic elements such as La, Ce, Pr, Nd, Mg, Ni, Al, Co, Mn, and Zn to a specific mole ratio, putting such mixture in a high-frequency induction furnace with an argon gas atmosphere to be melted, then rapidly cooling the molten metal to form alloy ingots. The hydrogen storage alloy a had a compositional formula expressed by $La_{0.8}Ce_{0.1}Pr_{0.05}Nd_{0.05}Ni_{4.2}Al_{0.3}(Co,Mn)_{0.5}$.

Similarly, the hydrogen storage alloy b had a compositional formula expressed by $La_{0.2}Pr_{0.3}Nd_{0.3}Mg_{0.2}Ni_{3.1}Al_{0.2}$, the hydrogen storage alloy c had a compositional formula expressed by $Nd_{0.9}Mg_{0.1}Ni_{3.2}Al_{0.2}Co_{0.1}$, the hydrogen storage alloy d had a compositional formula expressed by $La_{0.2}Pr_{0.1}Nd_{0.5}Mg_{0.2}Ni_{3.6}Al_{0.3}$, and the hydrogen storage alloy e had a compositional formula expressed by $La_{0.2}Nd_{0.7}Mg_{0.1}Ni_{3.5}Al_{0.1}Zn_{0.2}$.

Next, the melting point (Tm) of each of the hydrogen storage alloys a to e obtained was determined using a differential scanning calorimeter (DSC). Then thermal treatment was performed on each hydrogen storage alloy a to e at a temperature 30° C. lower than its melting point (Ta=Tm−30° C.) for 10 hours (but other durations might be used in other cases). After that, the post-thermal-treatment composition of each hydrogen storage alloy a to e was analyzed by Inductively coupled plasma mass spectrometry (ICP). The results obtained are set forth in Table 1.

Subsequently, hydrogen storage alloy powders a to e were produced by coarse crushing of the hydrogen storage alloys a to e, followed by mechanical milling in an inert gas atmosphere until the average particle diameter was 25 µm. Next, identification of the crystalline structures of the hydrogen storage alloy powders a to e was performed via the powder X-ray diffraction method using an X-ray diffraction measuring instrument that had a Cu-Kα tube as X-ray source. Such X-ray diffraction measurement was performed at scanning speed 1°/min, tube voltage 40 kV, tube current 300 mA, scanning step 1°, measurement angle (2θ) 20 to 50°. From the XRD profiles obtained, the crystalline structure of each hydrogen storage alloy powder a to e was identified using a JCPDS chart.

Regarding the composition ratios of the various crystalline structures, the $A_5B_{19}$ type structure was taken to consist of $Ce_5Co_{19}$ and $Pr_5Co_{19}$ type structures, the $A_2B_7$ type structure to consist of $Nd_2Ni_7$ and $Ce_2Ni_7$ type structures, and the $AB_5$ type structure to consist of $LaNi_5$ type structure. The component percentages of each structure were calculated by applying to the XRD profiles that had been obtained the diffraction angle strength value of each structure according to the JCPDS, and the comparative strength ratio of each to the maximum strength value 42 to 44°. The results obtained are set forth in Table 1 below.

TABLE 1

| | | Component percentages in crystalline structure (%) | | | | |
| --- | --- | --- | --- | --- | --- | --- |
| | Composition of hydrogen storage alloy | $A_5B_{19}$ | | | | |
| Alloy | $Ln_{1-x}Mg_xNi_{y-a-b}Al_aM_b$ | $Ce_5Co_{19}$ | $Pr_5Co_{19}$ | Total | $A_2B_7$ | $AB_5$ |
| a | $La_{0.8}Ce_{0.1}Pr_{0.05}Nd_{0.05}Ni_{4.2}Al_{0.3}(Co,Mn)_{0.5}$ | 0 | 0 | 0 | 0 | 100 |
| b | $La_{0.2}Pr_{0.3}Nd_{0.3}Mg_{0.2}Ni_{3.1}Al_{0.2}$ | 0 | 0 | 0 | 99 | 1 |
| c | $Nd_{0.9}Mg_{0.1}Ni_{3.2}Al_{0.2}Co_{0.1}$ | 6 | 0 | 6 | 93 | 1 |
| d | $La_{0.2}Pr_{0.1}Nd_{0.5}Mg_{0.2}Ni_{3.6}Al_{0.3}$ | 65 | 27 | 92 | 8 | 0 |
| e | $La_{0.2}Nd_{0.7}Mg_{0.1}Ni_{3.5}Al_{0.1}Zn_{0.2}$ | 60 | 12 | 72 | 28 | 0 |

The following matters are evident from the results in Table 1. Among the hydrogen storage alloys a to e, whose general formula is $Ln_{1-x}Mg_xNi_{y-a-b}Al_aM_b$, those that do not satisfy the conditions $0.1 \leq x \leq 0.2$, $3.5 \leq y \leq 3.9$, $0.1 \leq a \leq 0.3$, $0 \leq b \leq 0.2$, namely the hydrogen storage alloys a and b, are constituted of $AB_5$ type structure, and of $A_2B_7$ type structure and $AB_5$ type structure, respectively. On the other hand, the hydrogen storage alloys c, d and e, which do satisfy the foregoing ranges, have a mixed phase constituted of at least $A_2B_7$ type structure and $A_5B_{19}$ type structure.

2. Hydrogen Storage Alloy Electrodes

First of all, each of hydrogen storage alloy powders a to e were immersed for four days in an aqueous solution to which was added disodium hydrogenphosphate amounting to $1.0 \times 10^{-1}$ wt % by the mass of the alloy. Next, slurry of each of the hydrogen storage alloys were prepared by draining away the disodium hydrogenphosphate aqueous solution until the water content was 8%, then adding 0.5 parts by mass of SBR (styrene-butadiene latex), as non-water-soluble binder, to 100 parts by mass of the hydrogen storage alloy powder, together with an appropriate quantity of water (purified water might alternatively have been used), and mixing these.

After that, negative electrode substrates constituted of nickel-plated punched metal were prepared, each slurry was spread over one of the substrates so that the packing density was $5.0 \text{ g/cm}^3$ and allowed to dry, then the substrates were rolled to a specific thickness. Following that, the resulting items were cut to specific dimensions (yielding negative electrode surface area (short axis length×long axis length×2) of $800 \text{ cm}^2$, but other dimensions will be possible in other cases) to produce hydrogen storage alloy electrodes 11 (a1 to e1). The item for which hydrogen storage alloy a had been used was designated hydrogen storage alloy electrode a1, that for which hydrogen storage alloy b had been used was designated hydrogen storage alloy electrode b1, that for which hydrogen storage alloy c had been used was designated hydrogen storage alloy electrode c1, that for which hydrogen storage alloy d had been used was designated hydrogen storage alloy electrode d1, and that for which hydrogen storage alloy e had been used was designated hydrogen storage alloy electrode e1.

3. Nickel Electrodes

Porous sintered nickel substrates with porosity of approximately 85% were immersed in a 1.75 specific gravity mixed aqueous solution of nickel nitrate and cobalt nitrate, so as to cause nickel salt and cobalt salt to be held inside the pores of the porous sintered nickel substrates. Then the porous sintered nickel substrates were immersed in an aqueous solution of 25% by mass sodium hydroxide (NaOH), so as to convert the nickel salt and cobalt salt into nickel hydroxide and cobalt hydroxide respectively.

Next, the porous sintered nickel substrates were thoroughly rinsed with water to remove the alkaline solution, and were dried. Then active material with nickel hydroxide as main constituent was packed into the substrates' pores. Such active material packing operation was repeated six times (other numbers of repetitions will be appropriate in other cases), so that the active material with nickel hydroxide as main constituent was packed into the porous sintered nickel substrates' pores to a packing density of $2.5 \text{ g/cm}^3$. Subsequently the substrates were allowed to dry at room temperature, then cut to specific dimensions to form nickel electrodes 12.

4. Nickel-Hydrogen Storage Batteries

After that, spiral electrode was fabricated by rolling into spiral forms, with separators 13 constituted of polypropylene nonwoven fabric interposed therebetween, the hydrogen storage alloy electrodes 11 and the nickel electrodes 12 fabricated in the foregoing ways. At the bottom of the spiral electrode thus fabricated there was a substrate exposed portion 11c where the hydrogen storage alloy electrode 11 was exposed, and at the top thereof, a substrate exposed portion 12c where the nickel electrode 12 was exposed. Subsequently, electrode assemblies were created by welding a negative electrode collector 14 to the substrate exposed portion 11c exposed at the bottom end surface of the spiral electrode arrays thus obtained, and welding a positive electrode collector 15 to the substrate exposed portion 12c of the nickel electrode 12 exposed at the top end surface of the spiral electrode arrays.

Next, the electrode assemblies obtained were placed inside outer cans 17 having the shape of a bottomed cylinder and constituted of iron plated with nickel (and the outer face of the bottom of which served as the negative electrode external terminal), after which the negative electrode collector 14 was welded to the inner surface of the bottom of the outer cans 17. Also, a collection lead portion 15a extending from the positive electrode collector 15 was welded to the bottom portion of a sealing body 18 which served also as the positive electrode terminal and around whose outer circumference there was fitted an insulating gasket 19. The sealing body 18 was provided with a positive electrode cap 18a, and inside the positive electrode cap 18a a pressure valve (not indicated in the drawing) was disposed that included a valve body 18b that changed shape at a certain pressure, and a spring 18c.

Next, an annular grooved portion 17a was formed around the outer circumference of the top of the outer can 17, electrolyte was put in, and the insulating gasket 19 fitted to the circumference of the sealing body 18 was mounted onto the annular grooved portion 17a formed at the top of the outer can 17. Following that, an aperture rim portion 17b of the outer cans 17 was caulked to complete the fabrication of the nickel-hydrogen storage batteries 10 (A to E). The electrolyte was alkaline electrolyte consisting of a 30% by mass potassium hydroxide (KOH) aqueous solution, and was poured into the inside of the outer can 17 so as to constitute 2.5 g per battery capacity Ah (=2.5 g/Ah).

The item for which hydrogen storage alloy electrode a1 was used was designated battery A, that for which hydrogen storage alloy electrode b1 was used was designated battery B, that for which hydrogen storage alloy electrode c1 was used was designated battery C, that for which hydrogen storage alloy electrode d1 was used was designated battery D, and that for which hydrogen storage alloy electrode e1 was used was designated battery E.

5. Battery Tests (1) Cross-Sectional Analysis of Hydrogen Storage Alloys

Next, batteries A to E fabricated in the foregoing ways were charged in a 25° C. atmosphere at 1It charge current to a 120% SOC (state of charge), then rested for 1 hour. Following that, the batteries were kept in a 70° C. atmosphere for 24 hours, after which they were discharged in a 45° C. atmosphere at 1It charge current until the battery voltage was 0.3V. This cycle was repeated twice, and thereby each battery A to E was activated.

The batteries A to E activated in the foregoing ways were dismantled in inert gas, and the negative electrode active material was made to peel from the hydrogen storage alloy electrodes a1 to e1, then rinsed with water and dried under reduced pressure so as to obtain hydrogen storage alloy powders. Next, the hydrogen storage alloy powders were dispersed between dummy substrates, and made to adhere by means of resin. Then the substrates were cut and polished. Following that, the cross-sections of the hydrogen storage alloy powders were observed using a transmission electron microscope (model JEM-2010F field-emission transmission electron microscope made by the JEOL Ltd.; accelerating voltage 200 kV). The observations revealed that the surface layer region of each hydrogen storage alloy powder exhibited a configuration (lightness/darkness) that differed from that of the bulk region. The surface layer corresponds to the region where the particles of the hydrogen storage alloy contact with the electrolyte, and measurement of its depth showed that it extends 100 nm inward from the surface of the hydrogen storage alloy.

Accordingly, the surface layer region (X region) and bulk region (Y region) of each hydrogen storage alloy powder composition were analyzed by means of an energy-dispersive X-ray spectrometer (model UTW Si(Li) semiconductor detector made by the Noran Instruments, Inc), so as to determine the content ratios (% by mass) of the nickel in the X and Y regions. The results were as set forth in Table 2 below. Note however that Table 2 does not give the results for battery D (hydrogen storage alloy electrode d1).

TABLE 2

| Hydrogen storage alloy electrode | Nickel content | | |
|---|---|---|---|
| | X region (% by mass X) | Y region (% by mass Y) | X/Y |
| a1 | 81 | 58 | 1.4 |
| b1 | 81 | 57 | 1.4 |
| c1 | 78 | 65 | 1.2 |
| e1 | 72 | 67 | 1.1 |

It is evident from the results in Table 2 that in each of the hydrogen storage alloy powders, the surface layer region (X region) has a greater nickel content ratio than the bulk region (region Y). But it is also evident that whereas with the hydrogen storage alloy powders a and b the ratio X/Y of the surface layer region's nickel content ratio X (% by mass) to the bulk region's nickel content ratio Y (% by mass) is 1.4, the hydrogen storage alloy powders c and e, which include $A_2B_7$ type structure and $A_5B_{19}$ type structure, have X/Y ratio of no more than 1.2 ($1.0<X/Y≦1.2$), smaller than that of the hydrogen storage alloy powders a and b. $1.0<X/Y$ is due to the fact that in hydrogen storage alloys that have dissolved components in their B component, the relation $Y<X$ must necessarily obtain.

This can be explained as follows. Generally when alkaline storage batteries are charged/discharged via activation and so forth, the dissolved components (rare earth elements, Al, Mn and the like) present in the surface layer of their hydrogen storage alloy powder elute into the alkaline electrolyte. As a result, the content ratio of the nickel, which does not elute, increases, so that the gradient between the nickel content ratios of the bulk and of the surface layer becomes large. However, since it is possible to make the $A_5B_{19}$ type structure's nickel content ratio per crystal lattice larger than that of the $AB_5$ type structure, it can be considered possible to alleviate the gradient between the bulk and surface layer nickel content ratios by making the compositional proportion of the $A_5B_{19}$ type structure larger.

(2) Output Characteristic Tests

Next, batteries A to E fabricated and activated as described above were subjected to evaluation of their output characteristics at low temperature ($-10°$ C., for the reason that the lower the temperature, the larger the contribution of the hydrogen storage alloys to the discharge performance). Charge-discharge tests were conducted in the following ways. After activation was complete, the batteries were charged in a $25°$ C. atmosphere at 1It charge current to a 50% SOC (state of charge), then rested for 1 hour. Following that, the batteries were charged in a $-10°$ C. atmosphere for 20 seconds at an arbitrary charge rate, then rested for 30 minutes. After that, the batteries were discharged for 10 seconds at an arbitrary discharge rate in a $-10°$ C. atmosphere, then rested for 30 minutes in a $25°$ C. atmosphere.

Such cycle of 20 seconds of charging at an arbitrary charge rate and 30 minutes of rest in a $-10°$ C. atmosphere, followed by 10 seconds of discharge at an arbitrary discharge rate in a $-10°$ C. atmosphere and 30 minutes of rest in a $25°$ C. atmosphere, was carried out repeatedly. For the arbitrary charge rate, the charge current was increased in the sequence 0.8It→1.7It→2.5It→3.3It→4.2It, and for the arbitrary discharge rate, the discharge current was increased in the sequence 1.7It→3.3It→5.0It→6.7It→8.3It. With each discharge rate, the voltage of each battery A to E when 10 seconds had elapsed was measured for each current level, so as to derive plots of the discharge V-I approximate curves.

The gradient of each discharge V-I approximate line plotted represents the assist output resistance, and the inverse of the assist output resistance was taken to be the index of discharge performance. The results obtained are set forth in Table 3, where the inverse of the assist output resistance in battery C is assigned the value 100, and the results for the other alkaline storage batteries A, B, D and E are expressed as values relative to such battery C value.

TABLE 3

| Battery | Inverse of assist output resistance |
|---|---|
| A | 70 |
| B | 77 |
| C | 100 |
| D | 126 |
| E | 115 |

It is plain from the results in Table 3 above that the batteries with a large assist output resistance inverse and superior discharge characteristics are batteries C, D and E, equipped with hydrogen storage alloy electrodes c1, d1 and e1 constituted of hydrogen storage alloys c, d and e which have a mixed phase made up of at least $A_2B_7$ type structure and $A_5B_{19}$ type structure. This is because in these batteries, the gradient between the content ratio of the nickel in the surface layer of hydrogen storage alloy particles and the content ratio of the nickel in the bulk is alleviated by causing $A_5B_{19}$ type structure, whose nickel content ratio can be increased, to be present in the bulk of the hydrogen storage alloy particles. It can be considered to be thanks to this feature that alteration (such as decrystallization) of the crystalline structure in the surface layer of hydrogen storage alloy particles is curbed, hydrogen diffusion resistance is reduced, and high output characteristics are obtained.

To sum up the foregoing, it can be said to be desirable for batteries to be equipped with hydrogen storage alloy electrodes that use as negative electrode active material a hydrogen storage alloy that has a composition expressed by the general formula $Ln_{1-x}Mg_xNi_{y-a-b}Al_aM_b$ (where Ln is at least one element selected from among rare earth elements including yttrium (Y), and M is at least one element selected from among Co, Mn and Zn), that satisfies the conditions $0.1≦x≦0.2$, $3.5≦y≦3.9$, $0.1≦a≦0.3$, $0≦b≦0.2$, and whose ratio X/Y of the surface layer region nickel content ratio X (% by mass) to the bulk region nickel content ration Y (% by mass) satisfies the condition $1.0<X/Y≦1.2$.

What is claimed is:
1. A hydrogen storage alloy electrode comprising:
negative electrode active material constituted of a hydrogen storage alloy containing at least a rare earth element, magnesium and aluminum;
a crystalline structure of the hydrogen storage alloy having a mixed phase made up of at least an $A_2B_7$ type structure and an $A_5B_{19}$ type structure; and
a surface layer of hydrogen storage alloy particles being so formed as to have a nickel content ratio greater than that of a bulk, a ratio X/Y of a nickel mass content ratio X of the surface layer to a nickel mass content ratio Y of the bulk being greater than 1.0 but no more than 1.2;

wherein the surface layer corresponds to a region where the particles of the hydrogen storage alloy contact with an electrolyte, and a thickness of the surface layer extends 100 nm inward from the surface of the hydrogen storage alloy.

2. The hydrogen storage alloy electrode according to claim 1, wherein the general formula of the hydrogen storage alloy is expressed by $Ln_{1-x}Mg_xNi_{y-a-b}Al_aM_b$, wherein Ln is at least one element selected from among rare earth elements including yttrium (Y), M is at least one element selected from among Co, Mn and Zn, and $0.1 \leq x \leq 0.2$, $3.5 \leq y \leq 3.9$, $0.1 \leq a \leq 0.3$, $0 \leq b \leq 0.2$.

3. The hydrogen storage alloy electrode according to claim 1, wherein the $A_5B_{19}$ type structure is constituted of a crystalline phase having at least a $Ce_5CO_{19}$ type structure.

4. An alkaline storage battery comprising:

a hydrogen storage alloy electrode using as negative electrode active material a hydrogen storage alloy containing at least a rare earth element, magnesium and aluminum;

a nickel positive electrode with nickel hydroxide as a main positive electrode active material;

a separator that keeps such two electrodes apart;

an alkaline electrolyte; and an outer can inside which the hydrogen storage alloy electrode, the nickel positive electrode, the separator and the electrolyte are housed;

a crystalline structure of the hydrogen storage alloy having a mixed phase made up of at least an $A_2B_7$ type structure and an $A_5B_{19}$ type structure; and a surface layer of hydrogen storage alloy particles being so formed as to have a nickel content ratio greater than that of a bulk, a ratio X/Y of a nickel mass content ratio X of the surface layer to a nickel mass content ratio Y of the bulk being greater than 1.0 but no more than 1.2;

wherein the surface layer corresponds to a region where the particles of the hydrogen storage alloy contact with an electrolyte, and a thickness of the surface layer extends 100 nm inward from the surface of the hydrogen storage alloy.

* * * * *